United States Patent [19]
Lehrke et al.

[11] Patent Number: 5,336,063
[45] Date of Patent: Aug. 9, 1994

[54] ELECTRIC DRIVE PUMP

[75] Inventors: Kennth E. Lehrke, Maple Grove; Neal A. Werner, Plymouth, both of Minn.

[73] Assignee: Graco Inc., Golden Valley, Minn.

[21] Appl. No.: 56,586

[22] Filed: Apr. 29, 1993

Related U.S. Application Data

[63] Continuation of Ser. No. 857,459, Mar. 25, 1992, abandoned, which is a continuation of Ser. No. 770,554, Oct. 3, 1991, Pat. No. 5,220,259.

[51] Int. Cl.$^5$ ............................................. F04B 35/04
[52] U.S. Cl. ................................... 417/415; 417/234
[58] Field of Search ............... 417/415, 234; 310/58, 310/64, 88, 89, 68 R, 72; 184/99

[56] References Cited

U.S. PATENT DOCUMENTS

| | | | |
|---|---|---|---|
| 445,013 | 1/1891 | Faul | 184/99 |
| 553,853 | 2/1896 | Huber | 184/99 |
| 681,615 | 8/1901 | Bowerbank | 184/99 |
| 1,017,935 | 2/1912 | Watres | 184/99 |
| 1,156,323 | 10/1915 | Shearer | 184/99 |
| 1,362,049 | 12/1920 | Starker | 310/88 |
| 1,438,026 | 12/1922 | Eichelberger | 184/99 |
| 3,433,415 | 3/1969 | Enssle | 417/234 |
| 3,590,957 | 7/1968 | Campbell | 184/99 |
| 3,776,666 | 12/1973 | Ludwig | 417/411 |
| 4,009,971 | 3/1977 | Krohn et al. | 417/415 |
| 4,537,565 | 8/1985 | Edler | 310/64 |
| 4,631,006 | 12/1986 | Murray | 417/234 |
| 4,810,169 | 3/1989 | Kranzle | 417/234 |
| 4,854,373 | 8/1989 | Williams | 310/64 |

*Primary Examiner*—Richard A. Bertsch
*Assistant Examiner*—Peter Korytnyk
*Attorney, Agent, or Firm*—Palmatier, Sjoquist & Helget

[57] ABSTRACT

An electric drive pump is designed for use in hazardous environments. The assembly is housed, including the motor controller and power supply, in an explosion proof housing. The rotary output of the motor has a cam thereon which is bracketed by a pair of followers attached to the reciprocating pump. If desired, a polytetrafluoroethylene stick is spring biased against one of the followers so as to provide lubrication to the assembly.

1 Claim, 4 Drawing Sheets

ELECTRIC DRIVE PUMP

RELATED APPLICATIONS

This is a file wrapper continuation of U.S. patent application Ser. No. 07/857,459, filed Mar. 25, 1992, now abandoned which is a continuation of co-pending U.S. patent application Ser. No. 07/770,554, filed Oct. 3, 1991, now U.S. Pat. No. 5,220,259.

BACKGROUND OF THE INVENTION

While electric drive fluid pumps are, of course, old and well known, they suffer from various deficiencies. First, electric drive pumps for pumping of paints and similar materials are well known but are generally designed for use in well ventilated environments such as construction. In these environments, the unit is merely plugged into the wall and turned on with an operating pressure selected via a dial by the operator.

Such pumps are not suited for use in hazardous environments and electric drive pumps sold to date in such environments have been very complex mechanisms whereby typically the motor is located at the pump and is connected remotely to a large controller which is in turn connected remotely to a power supply. Often the controller and power supply are designed to be located outside of the hazardous environment and in any case the various modules are always quite substantial in size and complexity. In addition, installation of such products can be quite complex and involved.

Applicant hereby incorporates by reference all material contained in U.S. Ser. No. 07/770,554 filed Oct. 3, 1991 by one of the Applicants of the instant invention. This application has now been issued as U.S. Pat. No. 5,220,259, issued Jun. 15, 1993, and it discloses the DC motor drive system utilized in the present invention.

SUMMARY OF THE INVENTION

It is therefore an object of this invention to provide a reciprocating electric pump which may be utilized in a hazardous environment while meeting all applicable safety standards. It is further an object of this invention to provide such a pump which is of reasonable size and which requires minimal operator competence to operate. It is yet another object of this invention that the pump (with all of its integral electrical components) may easily be connected to a source of electricity and operated.

In doing so, an explosion proof housing contains the motor and control and power supply components. The housing is broken down into several compartments within the explosion proof housing and which are connected appropriately.

First of all, a compartment is provided for the main power connection via some sort of explosion proof connector. Another compartment is provided for control input. In the simplest form, this may be a simple rheostat which establishes equivalent operating pressures. Under more complicated schemes, this can be used to connect via an RS-232 input or the like with other controlling entities such as some sort of system-wide controller.

The main compartment of the housing contains the main control board which contains the main electronics for such while the capacitors for use in the controller are actually located outside of the main housing for purposes of cooling. By utilizing this appropriate compartmentalization, a unit of quite acceptable size may be obtained and which is suited for use in an industrial environment.

The output of the motor has a generally heart-shaped cam thereon which is surrounded on two sides by roller followers contained in a follower assembly. One of the followers has biased against it a stick of TEFLON® polytetrafluoroethylene or other appropriate stick lubricant. As the cam and followers rotate, a small amount of lubricant is worn off onto the follower and transferred onto the cam thereby preventing significant wear of the surfaces.

The follower assembly is in turn attached to the input shaft of a reciprocating pump of any of a number of known types such as those previously known to be manufactured by the Assignee of the instant invention, Graco Inc.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

DESCRIPTION OF THE PREFERRED EMBODIMENT

Figure 1:
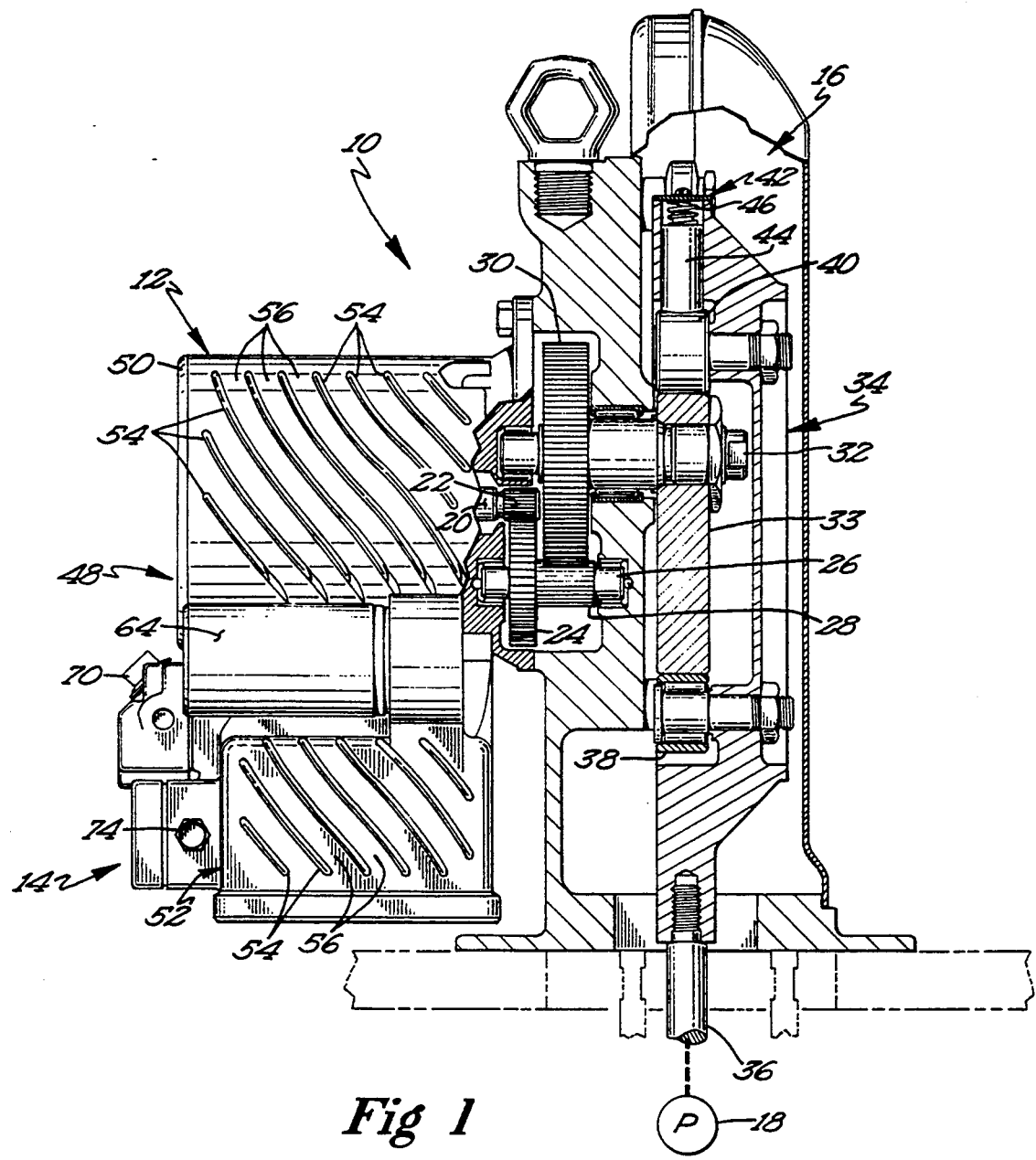
FIG. 1 is a partially cut away side view of the pump of the instant invention.

The pump of the instant invention, generally designated 10, is designed for use in hazardous environments and is comprised generally of a motor 12, control electronics 14, drive mechanism 16 and reciprocating piston displacement pump 18.

Turning to the mechanical end of the device, motor output shaft 20 has a gear 22 thereon which in turn drives gear 24 on idler shaft 26 which also has located thereon gear 28 which in turn drives gear 30. Gear 30 is mounted to main shaft 32 which has mounted on the end thereof a cam 33.

Figure 2:
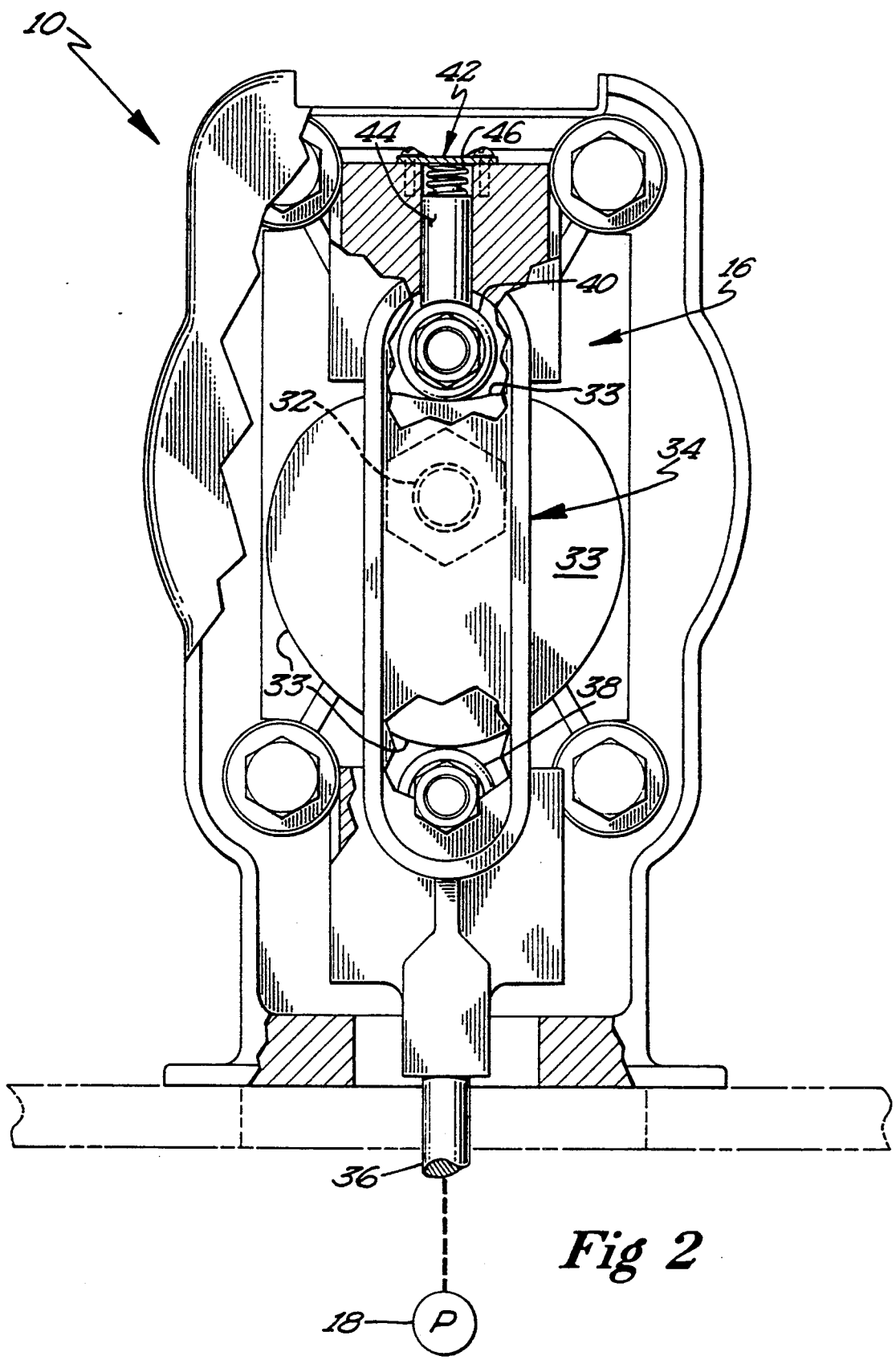
FIG. 2 is a front view partially cut away showing the drive mechanism of the instant invention.

Again, looking at FIGS. 1 and 2, a follower assembly 34 has attached to it at the bottom end thereof a pump shaft 36 which is attached to reciprocating pump 18. Follower assembly 34 has first and second rollers 38 and 40 respectively attached thereto which run on either side of cam 33 located adjacent the upper end of follower assembly 34 is lubrication mechanism 42 which is comprised of a stick 44 of TEFLON® brand polytetrafluoroethylene which is biased via a spring 46 against second roller 40. During operation, as roller 40 rotates, a small amount of material from stick 44 is deposited thereon which is in turn transferred to cam 33 and first roller 38 to prevent wear and reduce friction.

Turning more specifically to the electrical end of the device which is shown in FIGS. 1 and 3-9, electrical housing 48 is comprised generally of a motor housing 50 and control housing 52. Both housing are provided with a plurality of fins 54 which run generally parallel to one another and at an oblique angle (preferably 45°) to the axis of rotation which is denoted by shaft 20 of motor 12.

It can also been seen that fins 54 are curved in nature which, while they remain parallel, helps to promote heat transfer by increasing impingement of the air on the fins. By providing the fins at the aforementioned 45° angle, excellent cooling can be maintained whether the unit is positioned as shown in FIG. 1 or at right angles to that or if it is desired to drive the pump in a horizontal direction. The fins are curved over their length and form a plurality of air channels therebetween, each said air channel having first and second open ends and ideally a depth of at least one half inch to enhance air flow and heat transfer.

Figures 3, 4, 5:
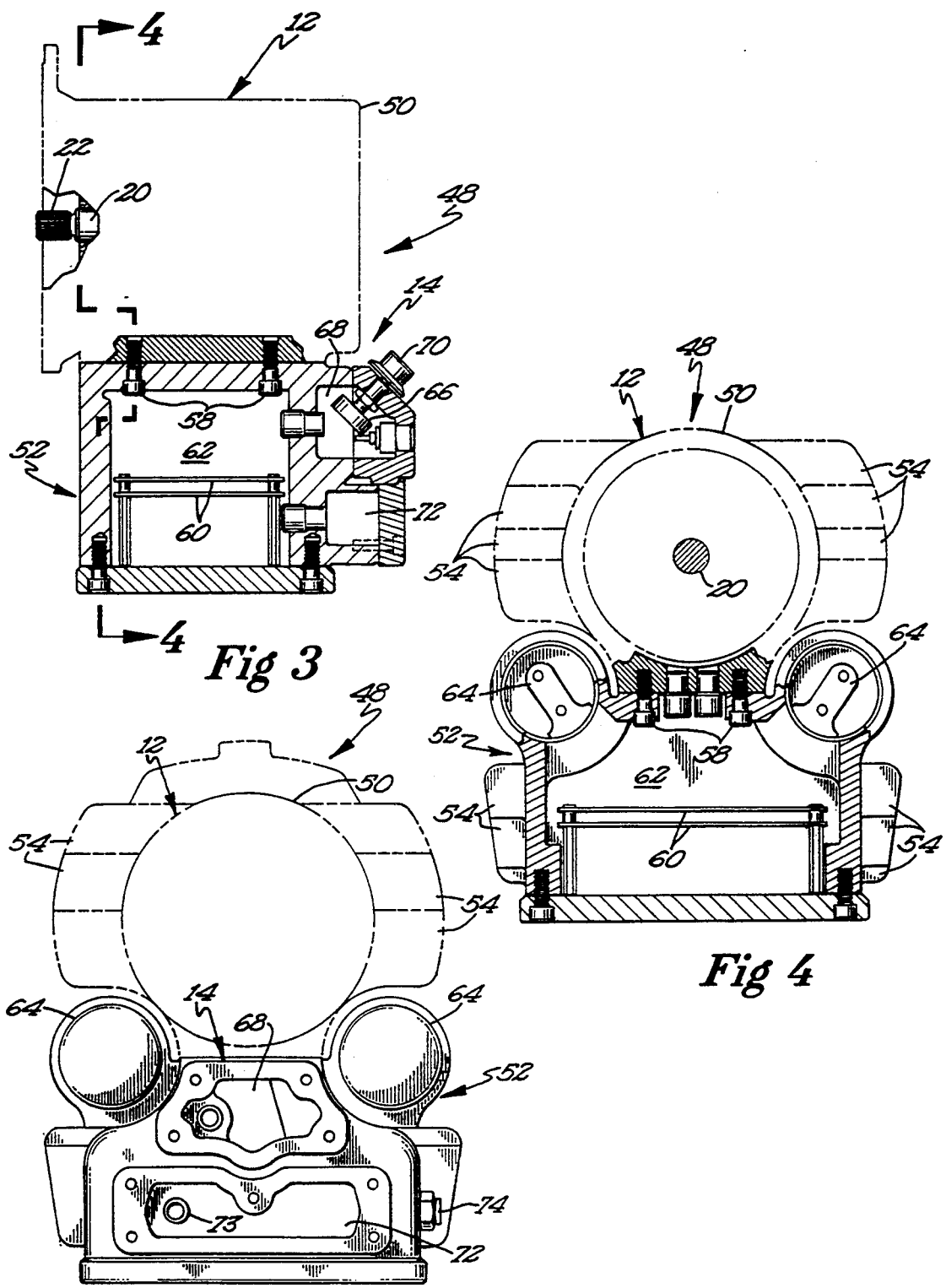
FIG. 3 is a side cross-sectional view of the motor and controls portion of the instant invention.
FIG. 4 is a sectional view taken along line 4—4 of FIG. 3.
FIG. 5 is an end view of FIG. 3.
Figure 6:
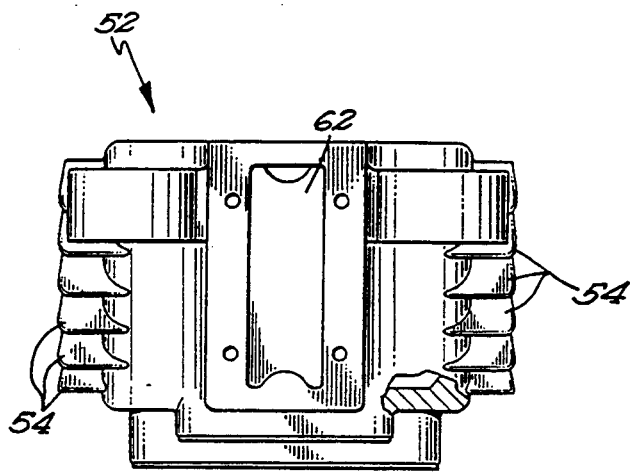
FIG. 6 is a top view of the control housing of the instant invention.
Figure 7:
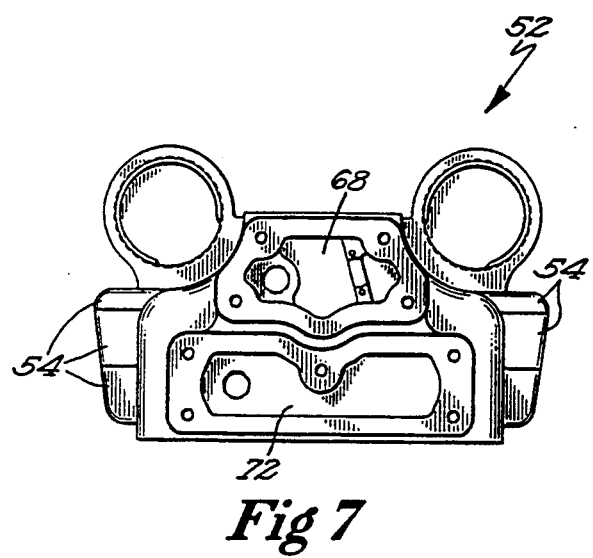
FIG. 7 is an end view of the control housing of the instant invention.
Figure 8:
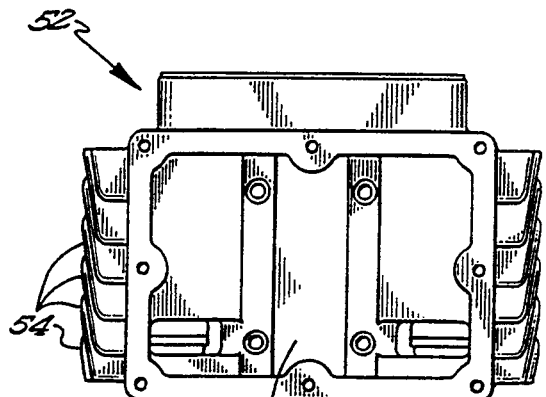
FIG. 8 is a bottom view of the control housing of the instant invention.
Figure 9:
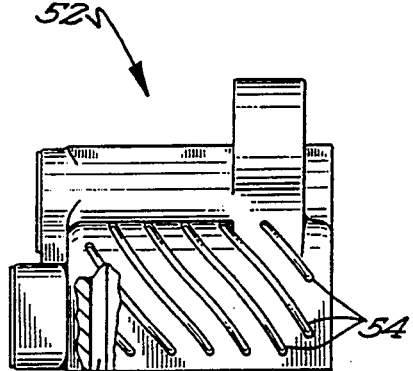
FIG. 9 is a side view of the control housing of the instant invention.

As can be seen best in FIGS. 3-5, electrical housing 48 is comprised of motor housing 50 and electronics housing 52 which are connected by bolts or other fastening means 58. Both housings are explosion proof and are designed to separate components by function and type. The main control board 60 is located in a main compartment 62 while capacitors 64 are hung outwardly on either side exterior of main compartment 64 to provide optimum cooling. Controller input may include a knob 70 for operator control which allows the operator to turn the device on and to adjust the pressure.

Details of the working of the circuits are shown in the aforementioned copending application. The main power input 73 is provided in a compartment 72 located on the bottom rear of the device via an explosion proof connector 74.

Electrical housing 52 is desirably a single casting as shown more specifically in FIGS. 6-9.

It is contemplated that various changes and modifications may be made to the electric drive pump without departing from the spirit and scope of the invention as defined by the following claims.

What is claimed is:

1. A DC motor drive system and reciprocable pump mounted in a compartmentalized explosion-proof housing for efficient cooling, comprising:
   a) a main compartment in said housing, containing a main control board for said DC motor drive system, said main compartment comprising a casting having an external surface with a plurality of raised, substantially parallel fins, said fins projecting at least about one-half inch above said external surface;
   b) a motor compartment in said housing, containing said DC motor drive, said motor compartment comprising a casting having an external surface with a plurality of raised, substantially parallel fins, said fins projecting at least about one-half inch above said external surface;
   c) means for mounting at least one capacitor to the exterior surface of said housing, said at least one capacitor forming a part of said DC motor drive system;
   d) a pump compartment in said housing, containing a reciprocable pump, and means for mechanically connecting said pump to said DC motor drive.

* * * * *